April 6, 1965 W. C. ROBERTS ETAL 3,176,556
CONTROL FOR THE BACK GAGE OF A CUTTING MACHINE
Filed Dec. 14, 1960 3 Sheets-Sheet 2

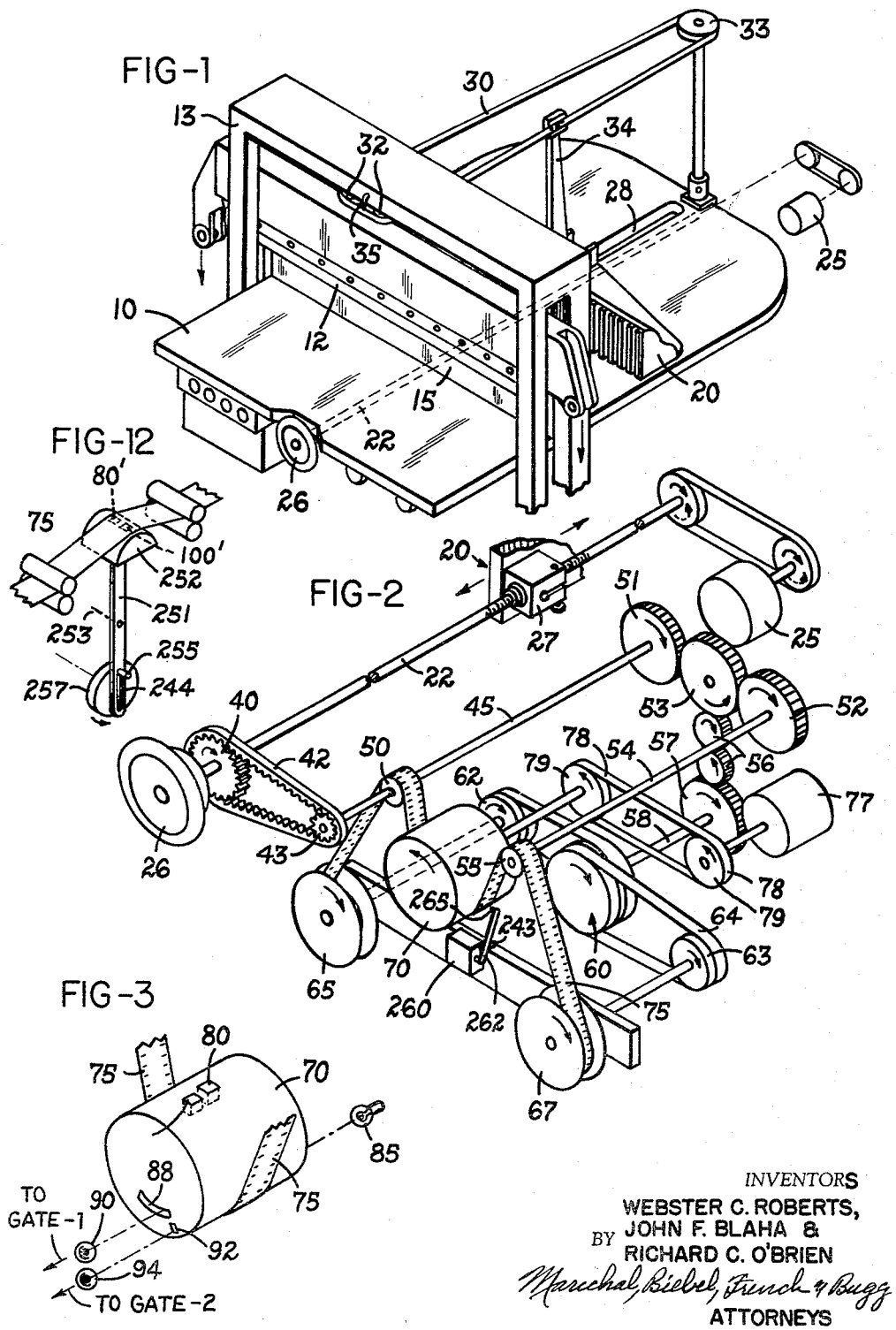

EMITTER FOLLOWER

WIDE BAND PREAMP

"AND" GATE

TRIGGER

INVENTORS
WEBSTER C. ROBERTS,
BY JOHN F. BLAHA &
RICHARD C. O'BRIEN

*Marchal, Biebel, French y Bugg*
ATTORNEYS

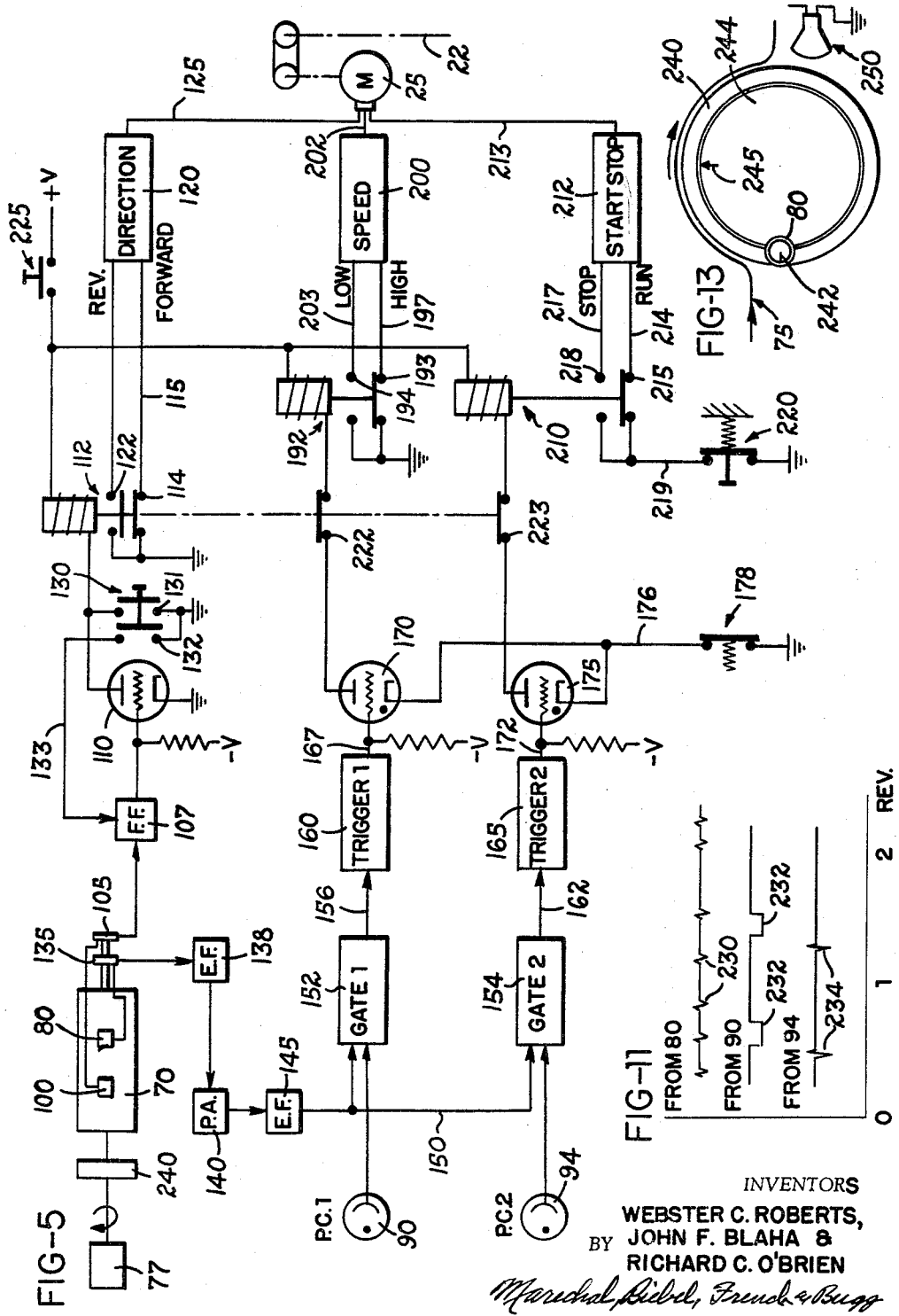

United States Patent Office 3,176,556
Patented Apr. 6, 1965

3,176,556
CONTROL FOR THE BACK GAGE OF A
CUTTING MACHINE
Webster C. Roberts, John F. Blaha, and Richard C.
O'Brien, Cleveland, Ohio, assignors to Harris-Intertype
Corporation, Cleveland, Ohio, a corporation of
Delaware
Filed Dec. 14, 1960, Ser. No. 75,798
13 Claims. (Cl. 83—71)

This application relates to cutting machines and the like, particularly to large paper cutters having a guillotine type knife and a controlled movable back gage for positioning the material to be cut with respect to the knife.

The primary object of this invention is to provide an improved and simplified back gage control for paper cutters and like machines whereby the positioning of the back gage may be governed accurately to close tolerances.

A further object of this invention is to provide a simplified back gage control which will cause the gage to traverse rapidly toward a selected location, which will slow the gage as it approaches the selected location, and then stop the gage exactly at the selected location, thereby avoiding inaccuracy due to inertia of the back gage mechanism in motion.

Another object of the invention is to provide such a back gage control which operates from a control tape which is magnetized at portions thereof along its length to indicate desired back gage settings, and which moves in direct relation to back gage movement and relative to a pickup device, providing an indication of the instantaneous position of the back gage.

A further object of the invention is to provide such a magnetic tape back gage control wherein the pickup device includes a head sensitive to magnetic fields which moves at relatively high speed with respect to the tape and which scans a substantial portion of the length of the tape, and a further control which determines when a control segment of the tape has reached a predetermined position along the path of movement of the scanning head.

An additional object of the invention is to provide a magnetic back gage control wherein the controls cooperating with the scanning head include circuits for slowing the move of the back gage when a control segment of the tape comes within range of the scanning head and for thereafter stopping the back gage in a precise location when the same control segment reaches an exact position relative to the scanning head.

Another object of this invention is to provide a magnetic back gage control which is capable of sensing control pulse from a magnetic member mounted to move with the back gage while the back gage is in a stationary position.

A further object of this invention is to provide such a magnetic back gage control which is capable of sensing separately control marks or pulses on a magnetic record member in close proximity to each other, and thus to provide for trim-out cuts.

Other objects and advantages of the invention will be apparent from the following description, the accompanying drawings and the appended claims.

In the drawings—

FIG. 1 is a diagrammatic illustration showing a cutting machine of the general type to which the present invention is directed;

FIG. 2 is a diagrammatic showing of the coupling between the back gage lead screw and the record control tape transport mechanism;

FIG. 3 is a somewhat diagrammatic illustration of a suitable pickup mechanism used to scan the record tape which moves with the cutter back gage;

FIG. 5 is a circuit diagram of a suitable control circuit for receiving the outputs from the apparatus shown in FIG. 3 and controlling the movement of the back gage;

FIG. 11 is a graphic illustration of the pulse signals received by the gate circuits;

FIG. 12 is a modified arrangement of pickup head; and

FIG. 13 is a diagrammatic showing of a visual indicator system which may be used with the invention.

Figure 4:
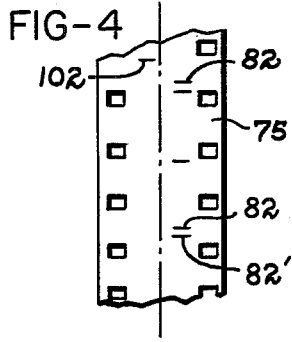
FIG. 4 is an enlarged view of a segment of the record tape.

Referring to the drawings, which illustrate a preferred embodiment of the invention, FIG. 1 illustrates in diagrammatic fashion a typical cutting machine with which the present invention is associated. Details of one typical machine of this type are shown in Spiller et al. Patent No. 2,599,591, issued June 10, 1952. Generally, the machine includes a table 10 having a guillotine type knife 12 mounted in a vertically extending frame 13 for reciprocating movement toward and away from table 10 under the control of suitable drive mechanism such as shown in said aforementioned patent. Rearwardly of the knife is a clamp 15 which is also mounted for vertical movement toward and away from the table for the purpose of clamping sheet material to be trimmed against the table surface during the cutting stroke of knife 12.

A back gage 20 rests upon the surface of table 10 rearwardly of the knife and is moveable toward and away from the cutting plane defined by the knife under the control of a lead screw 22 driven by a suitable two speed reversible motor 25. A hand control wheel 26 is also attached to lead screw 22 at the front of the machine for manual advance of the back gage if desired. The drive to the back gage is provided by a suitably threaded member 27 (FIG. 2) which engages lead screw 22 and includes a portion extending upwardly through the slot 28 in work table 10 into connection with back gage 20. Visual inspection of the back gage position is provided by a continuous flexible metal tape 30 passing around pulleys 32 on the frame 13 and around a rear pulley 33 supported above the rear edge of table 10. An arm 34 provides a rigid connection between tape 30 and back gage 20 for moving the tape past an indicator 35, and a suitable scale is carried on tape 30 for inspection by the operator with reference to indicator 35.

The mechanical components of the present invention are shown diagrammatically in FIG. 2, wherein a sprocket 40 is fixed to lead screw 22 for rotation therewith, and a timing belt 42 meshes with sprocket 43 fixed to a countershaft 45. The countershaft carries a first tape drive sprocket 50 as well as a drive gear 51, and a further gear 52 is driven through idler 53 which meshes with gear 51. Gear 52 is carried upon a second shaft 54 which in turn carries a second tape drive sprocket 55. Idlers 56 mesh with gear 53 and a transport drive gear 57 coupled through shaft 58 to a two-way override clutch 60 which in turn drives slip clutches 62 and 63 through suitable chains or belts 64. Slip clutch 62 is connected to rotate the left hand tape reel 65, and slip clutch 63 is connected to rotate the right hand tape reel 67.

The arrangement of these parts is such that when back gage 20 is moving forward the tape moves from left to right as viewed in FIG. 2, with the travel of the tape being in direct relation to the rotation of lead screw 22, and thus directly related to movement of the back gage. In a preferred embodiment of the invention favorable results have been obtained with the ratio of tape travel to back gage travel at three to one, producing a three inch travel of the tape for every one inch travel of the back gage. When the back gage is moving forward, with the tape being reeled upon the right hand reel 67, that reel is slightly over-driven, by appropriate relations of the gears 53, 57 for the purpose of maintaining tension on the tape. The slip clutch 63 prevents damaging of the tape. Conversely, on reversal the left hand reel 65 is overdriven while the right hand reel 67 is free to turn, again maintaining tension in the direction in which the tape is moving.

A sensing drum 70 is mounted between tape drive sprockets 50 and 55, in such a position that the magnetic tape 75 wraps about a substantial surface of drum 70. The drum is rotated at a relatively high constant speed, for example approximately 3600 r.p.m., by a motor 77 through belt 78 and pulleys 79. In the surface of drum 70 there is mounted a conventional magnetic recording head 80 (FIG. 3) which thus is scanned rapidly over a segment of the length of the tape during each revolution of drum 70. Thus, the recording head 80 provides a means for sensing magnetic pulses 82 recorded on tape 75, and is driven so as to scan cyclically over a portion of the path along which that tape travels. In addition, a light 85 is supported to illuminate the interior of the drum 70, and in one of the sides of the drum there is an elongated slot 88 extending along a common radius with respect to the axis of rotation of the drum. Aligned with slot 88 is a photocell pickup 90 which thus senses a substantial quantity of light for each revolution of the drum, providing a broad or elongated pulse output from photocell 90 during each revolution of the drum.

In addition, there is a small slit or opening 92 in the face of drum 70, and a second photocell 94 is supported to intercept the beam of light passed through slit 92. Thus, a short or sharp pulse is emitted from photocell 94 once during each revolution of drum 70. The slit 92 is aligned with one end of slot 88 and the two photocells are so positioned with respect to the loop of magnetic tape 75 passed over drum 70 that a control position is defined for recording head 80 wherein passage of a portion of tape 75 carrying a magnetic pulse 82 when aligned with the rotating recording head 80 will define the desired position of the system to locate properly the back gage 20.

A further recording head 100 is carried in drum 70, providing control over the direction of movement of back gage 20. This head 100 cooperates with a separate channel on the tape, as shown in FIG. 4, to provide direct controlling impulses when the head moves relative to the magnetic impulses 102 which have been recorded in this channel to provide indication of the starting and finishing positions of the back gage for a job. The output of head 100 is fed through slip ring 105 to a bi-stable flip-flop circuit 107, and this circuit in turn is connected to the grid of a control triode 110. The connection is such, as well known in the art, that the grid follows the state of the flip-flop circuit 107 and thus triode 110 is conducting for one state of the flip-flop circuit and is cut off for the other state.

The plate circuit of triode 110 includes the control coil of a directional control relay 112, and one set of contacts 114, normally closed, of this relay completes the circuit 115 to a direction control unit 120, while a normally open set of contacts 122 may complete a reverse circuit to direction control unit 120. The output 125 of the direction control is connected to the back gage drive motor 25, and thus with relay 112 normally energized the back gage will be driven in a forward direction, while when the relay is energized the motor 25 will operate in reverse.

A manually operated reversing switch 130, having contacts 131 connected in parallel with triode 110, provides a manual over-ride by which the operator may energize relay 112 to operate the back gage in a reverse direction at his option. A further set of contacts 132 on switch 130 is connected to provide a reset pulse through line 133 to the flip-flop circuit 107 whenever the manual override switch 130 is closed.

Figure 7:
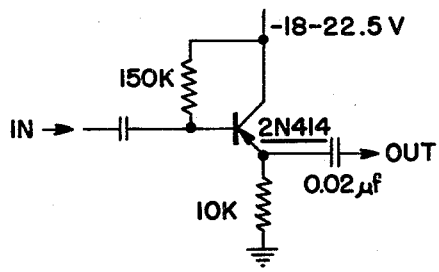
FIG. 7 is a schematic diagram of a suitable emitter follower circuit which may be used in the circuit of FIG. 5.
Figure 8:
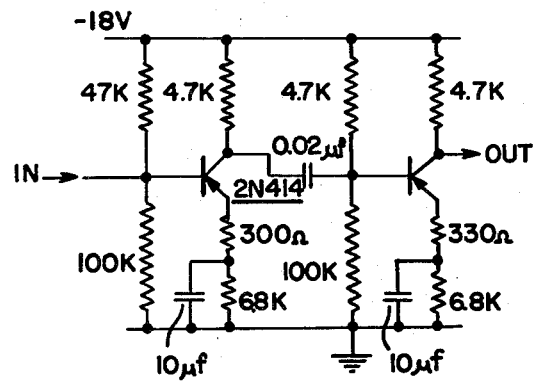
FIG. 8 is a diagram of a suitable amplifier circuit.
Figure 9:
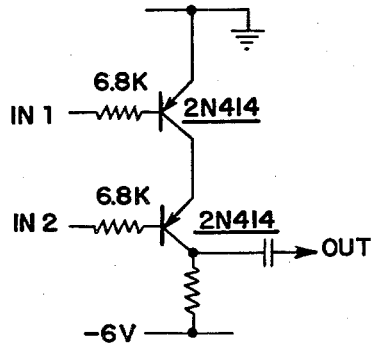
FIG. 9 shows a suitable gate circuit which may be used in FIG. 5.

The output of magnetic recording head 80 is fed through slip ring 135 to a suitable emitter follower circuit 138, details of which are shown in FIG. 7. The output of this circuit is fed in turn into a wide band pre-amplifier 140, shown in detail in FIG. 8, and the output of preamplifier 140 is connected to a further emitter follower circuit 145 having an output line 150 which is connected to a first "and" gate circuit 152, and a second "and" gate circuit 154. Details of a suitable "and" gate circuit are shown in FIG. 9.

Figure 10:
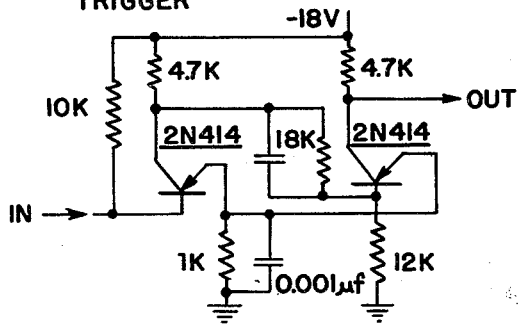
FIG. 10 is a diagram of a suitable trigger circuit which may be used in the control of FIG. 5.

The first "and" gate 152 also receives the output pulses from photocell 90, and the second gate circuit 154 receives pulses from photocell 94. Therefore, referring to FIG. 11, when a pulse through line 150 coincides with a pulse from photocell 90, gate 152 will pass a pulse through its output line 156 to a trigger circuit 160. Details of a suitable trigger circuit are shown in FIG. 10. Similarly, when an output pulse from photocell 94 coincides with a pulse from line 150, gate 154 will pass a pulse through its output line 162 to a second trigger circuit 165.

It is to be understood that the circuitry shown in FIGS. 7-10 is exemplary only, since many different types of emitter follower or cathode follower circuits, preamplifier circuits, "and" gates, and trigger circuits may be used in carrying out the invention. The transistorized circuits shown have proved adequate and reliable in practice, and therefore are illustrated by way of example.

Figure 6:
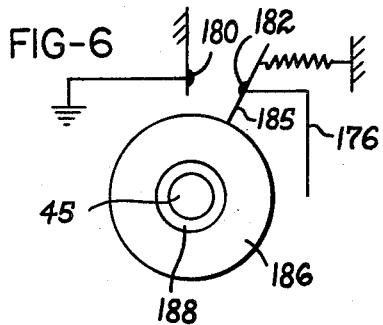
FIG. 6 is a detail view of a control switch shown schematically in FIG. 5.

The output 167 from trigger circuit 160 is connected to the grid of a suitable triode thyratron 170, for example type 2D21, and similarly the output 172 of trigger circuit 165 is connected to the grid of a second triode thyratron 175. The cathode circuits of both thyratrons are connected through line 176 and through a switch 178 to ground. Details of switch 178 are shown in FIG. 6. This switch includes a grounded stationary contact 180 and a movable contact 182 which is biased by spring 183 toward an open position. Contact 182 is carried on an arm 185 secured to a collar 186, which is mounted on a shaft connected to rotate with the back gage lead screw 22, for example upon shaft 45 of FIG. 2. Collar 186 is not directly connected to shaft 45, but a suitable friction material 188 is placed between the collar and the shaft. Thus, when the shaft 45 is stationary spring 183 will open switch 178, but when the shaft is rotated the friction force transmitted to collar 186 will rotate arm 185 to close the switch. It follows, therefore, that when the back gage is stationary switch 178 will open and thyratrons 170 and 175 will be extinguished.

The plate of thyratron 170 is connected through line 190 to control energization of a double-pole double-throw speed control relay 192 having normally closed contacts 193 and normally open contacts 194. Contacts 193 are connected to the high speed control line 197 of the speed control unit 200, which has its output 202 connected to motor 25 for controlling high and low speed operation thereof. Contacts 194 are connected to complete the lower speed control circuit 203 when relay 192 is energized.

The plate of thyratron 175 is connected to output line 205 which controls the operation of a double-pole double-throw relay 210 having contacts which govern operation of the start-stop controller 212. This controller has its output 213 connected to motor 25 for starting and stopping the motor. Thus, the run circuit 214 includes normally closed contacts 215, and the stop circuit 217 includes normally open contacts 218 which will be closed when relay 210 is energized to stop motor 25. In the ground circuit 219 from these contacts is a switch 220, openable by operation of the manual controls which the operator must engage to operate the knife 12. For example, switch 220 may be opened by the knife operating mechanism whenever a cutting cycle is initiated, and remain open until operation of the knife 12 and clamp 15 is completed. This feature will also provide an interlock preventing movement of the back gage during a cutting cycle.

As shown in FIG. 5, relay 112 also includes a set of normally closed contacts 222 in line 190 and a further set of normally closed contacts 223 in line 205. These contacts open the control lines for relays 192 and 210 when the reversing relay 112 is energized, thus assuring that controller 212 is in the "run" condition and that controller 200 is in its "high" condition to power the back gage in a reverse direction at high speed.

The operation of the present control system will be initiated automatically by closing the start switch 225 which supplies power to the control relays. The motion control relay 210 is normally in its on or run position, the speed control relay 192 in its high speed position, and the direction control relay 112 in the forward position. Therefore, the back gage will advance toward the knife at high speed and the magnetic tape 75 will pass from reel 65 to reel 67 over the surface of sensing drum 70, which is rotating at relatively high speed, for example 3600 r.p.m. For practical purposes the record tape is substantially stationary with respect to the rotating sensing drum.

As the tape moves from one reel to the other in accordance with advance of the back gage, the first positioning record pulse 82 on the tape will pass over the drum surface, and pickup head 80 will sense this pulse and pass output pulses, once for each revolution of the drum with respect to the record pulse or indicia on the tape, these pulses being indicated in FIG. 11 as a string of closely spaced pulses shown at 230. Also for each revolution of the drum a broad pulse will be passed from photocell 90, as shown at 232 of FIG. 11, and when one of the pulses from pickup head 80 coincides with such broad pulse the "and" gate circuit 152 will pass a pulse through its output to fire thyratron 170, energizing the speed control relay 192 and thereby causing the speed controller to shift to its slow position and slow down the advancing movement of the back gage.

As the back gage continues to move at slow speed one of the pulses from pickup head 80 will coincide with a pulse 234 from the photocell 94, causing "and" gate circuit 154 to pass an output pulse to the motion controller which will fire thyratron 175, energizing relay 210 causing it to shift to the stop position and passing a stop signal to the motion controller which will halt motor 25, positioning the back gage in exact position.

The back gage will then remain in position and the operator may actuate the cutting cycle by operating suitable controls, such for example as shown in the aforementioned Patent No. 2,649,155. During the cutting cycle switch 220 will be opened to provide the desired saftey interlock, and switch 178 will open to extinguish the thyratrons, preparing the back gage control circuit for automatic operation once the cutting cycle is completed. At that time switch 220 will be closed, and with the motion control relay deenergized the back gage motor will advance the back gage while switch 178 will remain open for a short interval sufficient to permit the magnetic record tape to advance the record pulse thereon beyond a position where a pickup from that pulse would coincide with a pulse from photocell 94. This short delay in reactivating the thyratron circuits permits the record tape to advance off the "spot" where the back gage previously stopped.

Under some conditions it may be useful for the operator to have a visual guide of back gage movement, particularly to anticipate an impending stop. A suitable arrangement for this purpose is shown in FIGS. 5 and 13, including a disc 240 which rotates with drum 70, and a reference mark 242 on the disc which is aligned with the pickup head 80. A stationary disc 244 is mounted adjacent the rotating disc 240, and carries a fixed reference mark 245 representing the "stop" position, i.e., where pulses from head 80 and photocell 94 will coincide.

The output of the preamplifier circuit 140 is connected to a stroboscopic lamp 250 which is mounted to illuminate the reference marks 242 and 245, and since each output pulse from head 80 will flash the lamp, the illumination of mark 242 will reflect the position of an impulse generating mark on tape 75. The operator can thus watch the discs 240 and 244 and see the illuminated marks approach their coinciding or registering position, where the back gage will stop.

The back gage will continue to advance and halt at each position defined by the spaced control pulses 82 on the record tape in the same manner as above described. If a trim-out cut is desired, wherein two control pulses are relatively closely spaced, for example to provide a total advance of the back gage of only approximately 1/64 of an inch, the trim-out pulse 82' on the tape will be spaced only three times that distance from the preceding record pulse, or approximately 1/20 of an inch. Therefore, although the delay mechanism above mentioned will permit the tape to move beyond the first stopped position, as the back gage circuit is reactivated a pulse will be passed immediately to the speed control relay and the back gage will be advanced at slow speed only for this short distance.

When the end of a recording cycle is reached the pickup head 100 will sense a pulse 102 in the other channel and the flip-flop circuit 107 will reverse its state, causing triode 110 to conduct and energize the directional control relay 112, which in turn passes a reverse signal to the direction control while also opening the control circuit for the motion control and speed control relays to assure that these relays remain in their deenergized positions. This causes the back gage to be moved to its farthest rearward position at high speed. When such rearward position is reached a further pulse 102 in the direction control channel will cause flip-flop 107 again to reverse its state and triode 110 will be cut off, shifting the direction unit to forward and setting up the motion and speed control relays so that the back gage proceeds in a forward direction and halts at the first record pulses.

If at any time during operation of the system the operator desires to begin the back gage cycle anew, he merely closes the reversing switch 130 which causes the same repositioning cycle of the back gage to occur as has just been described, and also passing a reset pulse to flip-flop 107 to assure that the flip-flop circuit is properly set up when the back gage reaches its farthest rearward position.

The magnetic control impulses may be placed on tape 75 in any conventional manner so as to define the program of movement of the back gage or other movable member to the control. In the illustrated embodiment the program of control impulses may be placed on the tape by running the cutter through the job cycle manually for the first time, and energizing the solenoid 260 (FIG. 2) by closing a suitable control switch (not shown). The solenoid armature carries an arm 262 of insulating material which is pivotally supported at 263 and carries a permanent magnet 265 at its outer end adapted to be moved into contact with the control tape when solenoid 260 is energized. Thus, at each setting of the back gage the permanent magnet 265 induces a magnetic impulse on the surface of the control tape, and these pulses are sensed by recording head 80, as described above, to control the programmed movement of the back gage.

FIG. 12 discloses a modified arrangement of mounting the magnetic pickup heads for cyclic movement over a path along which the record tape is moved. In this modified construction an arm 251 carries the pickup heads 80' and 100' in a head portion 252. The arm is pivotally mounted at 253, and includes a slot 254 receiving a crank pin 255 eccentrically mounted on a drive wheel 257. As will be obvious from inspection of FIG. 12, rotation of the driving wheel will cause the pickup heads 80' and 100' to scan along a path over which the magnetic control tape is moved in correlation with movement of the back gage or other member to be controlled.

The present invention therefore provides a simplified and accurate control system for the operation of the back gage on cutting machines, as well as for other similar apparatus wherein it is desired to control the exact position of a moving part, and to halt such part accurately in a number of separate positions according to a predetermined program. As will be apparent from the foregoing description, the present control system accomplishes this function without the need of manual attention, and is capable of positioning the moving part in any of its desired positions during the program movement within an accuracy of ±0.001 inch.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination with a cutting machine having a table and a knife reciprocably operable in a cutting plane transversely of said table, a back gage operable along the surface of said table toward and away from said cutting plane to position material to be cut with respect to said knife, back gage position control means movable along a defined path in relation to movement of said gage and including a plurality of pulse generating means spaced thereon to define successive positions of said back gage, drive means for moving said back gage pulse sensing means for scanning said position control means, means driving said sensing means to scan cyclically over a substantial portion of the path along which said position control means travels, means defining a reference position in said portion of said path scanned by said sensing means and including means generating an impulse for said reference position, and means operative by pulses from said pulse sensing means and said reference position means to disable said drive means and halt said back gage in response to a predetermined relation between said pulse generating means and said reference position.

2. In combination with a cutting machine having a work table and a knife reciprocably operable in a cutting plane transversely of said table, a back gage operable along the surface of said table toward and away from said cutting plane to position material to be cut with respect to said knife, a tape having impulse generating means thereon in spaced relation along the length thereof for defining a sequence of differently spaced positions of said back gage relative to said cutting plane, means supporting said tape for movement thereof in correlated relation to movement of said back gage, drive means for moving said back gage, pulse sensing means for scanning said tape, means driving said sensing means to scan cyclically over a substantial portion of the path along which said tape travels, means including an impulse generating means for defining a reference point in said portion of said path scanned by said sensing means, and means operative by pulses from said pulse sensing means and said reference pulse generating means to disable said drive means and position said back gage in response to a predetermined relation between a pulse generating means on said tape and said reference point.

3. A control for positioning a movable member in a plurality of predetermined successive positions, comprising two-speed drive means connected to drive said member; means carrying a plurality of pulse generating means in predetermined spaced relation thereon providing a record of desired successive positions of said member; means defining a reference position including means for generating an impulse for said reference position, means supporting said record means for movement relative to said reference position, means connecting said record means to move in correlated relation to said member, sensing means scanning said record means cyclically over a portion of the path of movement thereof including said reference position, means operatively connected with said sensing means and said two-speed drive means for reducing the speed thereof when a pulse generating means on said record means enters within the range of said sensing means, and means controlled by said sensing means and said reference pulse generating means for stopping said member when a pulse generating means is located in predetermined relation with respect to said reference position.

4. In combination with a cutting machine having a work table and a knife mounted for movement in a cutting plane with reference to said table, a back gage movable along said table for positioning material to be cut with respect to said cutting plane, two speed drive means connected to drive said back gage, means carrying a plurality of pulse generating means arranged in predetermined position thereon providing a record of desired successive positions of said back gage, means defining a reference position and including means generating an impulse for said reference position, means supporting said record means for movement relative to said reference position, means connecting said record means to move in correlated relation to said back gage, sensing means scanning said record means cyclically over a portion of the path of movement thereof including said reference position, means operatively connected with said sensing means and said two-speed drive means for reducing the speed thereof when a pulse generating means moves within range of said sensing means, and means controlled by said sensing means and by said reference pulse generating means for stopping said back gage when a pulse generating means on said record means is located in predetermined relation to said reference position.

5. In combination with a cutting machine including a work table, a knife mounted for reciprocating movement in a cutting plane with reference to said table, a back gage movable along said table for positioning material to be cut with respect to said cutting plane, means for driving said back gage toward and away from said cutting plane, a tape capable of storing magnetic impulses, means mounting said tape for movement thereof along a defined path in relation to movement of said back gage, a control drum, means for rotating said drum at a predetermined speed substantially in excess of the speed of movement of said tape, means mounting said tape to pass over a portion of the surface of said drum, an impulse sensing head in said drum adjacent one portion of the surface thereof, means for generating an impulse once during each revolution of said drum defining a reference position of said sensing head, an "and" gate circuit receiving impulses from said sensing head and said impulse generating means, and means responsive to an output from said "and" gate for disabling said driving means to halt said back gage at a position corresponding to the relative position of a magnetic impulse on said tape.

6. In combination with a cutting machine having a work table, a knife mounted for reciprocating movement in a cutting plane with reference to said table, a back gage movable along said table for positioning material to be cut with respect to said cutting plane, means for driving said back gage toward and away from said cutting plane, a control tape capable of storing magnetic impulses, means mounting said tape for movement thereof along a defined path in relation to movement of said back gage, control sensing means, means mounting said sensing means for oscillatory movement along a portion of the path of movement of said tape and at a speed substantially in excess of the speed of movement of said tape, means for generating an impulse once during each oscillation of said sensing means defining a reference position of said sensing means, an "and" gate circuit receiving impulses from said sensing head and said impulse generating means, and means responsive to an output from said "and" gate for disabling said driving means to halt said back gage at a position corresponding to the relative position of a magnetic impulse on said tape.

7. In a cutting machine the combination of a work table, a knife mounted for reciprocating movement in a cutting plane relative to said table, drive means for said knife, a back gage mounted on said table, back gage drive means connected to move said back gage toward and away from said cutting plane, a record control tape capable of storing record impulse generating means in predetermined sequence thereon providing a record of desired successive positions of said back gage, means supporting said tape to move in correlated relation to said back gage, a drive connection between said tape and said back gage drive means, sensing means scanning said tape cyclically over a substantial portion of the path of movement thereof, means including a reference pulse generating means defining a reference position within the scanning range of said sensing means, means controlled by pulses from said reference pulse generating means and from said sensing means and connected to stop said back gage when a pulse generating means on said tape is located in predetermined relation to said reference position, and an interlocking control connected to disable said back gage drive means in response to operation of said knife drive means.

8. In a cutting machine the combination of a work table, a knife mounted for reciprocation in a cutting plane relative to said table, a back gage mounted on said table for movement toward and away from said cutting plane, two-speed drive means connected to said back gage, a record control tape capable of storing record impulse generating means, means mounting said tape for movement in correlated relation to movement of said back gage, a drive connection from said back gage drive means engaging said tape to move said tape along a given path in relation to back gage movement, sensing means for scanning said tape and producing output impulses for each control pulse generating means on said tape, means mounting said sensing means to scan cyclically over a portion of the path of movement of said tape, a first pulse generating means connected to produce a pulse of relatively long duration during a portion of the scanning cycle of said sensing means, a first "and" gate circuit connected to receive pulses from said sensing means and said first pulse generating means and having an output for transmitting a control signal when a pulse from said sensing means coincides with a pulse from said first pulse generating means, said output of said first "and" gate circuit being connected to change the speed of said back gage drive means from a relatively faster to a relatively slower speed, a second pulse generating means arranged to produce a pulse of relatively short duration during each scanning cycle of said sensing means to define a reference position, a second "and" gate circuit receiving pulses from said sensing means and said second pulse generating means and having an output through which a signal pulse is transmitted upon coincidence of the input signals thereto from said sensing means and said pulse generating means, and a connection between said output of said second "and" gate circuit and said back gage drive means for stopping said back gage when an output signal is transmitted therethrough.

9. A control for positioning a movable member in a plurality of predetermined positions comprising position control means movable along a defined path in fixed relation to movement of said member and including a plurality of pulse generating means spaced thereon to define successive desired positions of said member, drive means connected to move said member, pulse sensing means for scanning said position control means, means driving said sensing means to scan cyclically over a portion of the path along which said position control means travels, means defining a reference position in said portion of said path scanned by said sensing means, means defining a control zone within said scanning path of said sensing means in advance of said reference position, means arranged to sense the entry of a pulse generating means into said control zone including a speed controller connected to reduce the speed of said movable member drive means, and means operative by said sensing means and said reference position defining means to stop said movable member in response to a predetermined relation between a pulse generating means and said reference position.

10. In combination with a cutting machine having a table and a knife reciprocably operable in a cutting plane transversely of said table, a back gage operable along the surface of said table toward and away from said cutting plane to position material to be cut with respect to said knife, back gage position control means movable along a defined path in relation to movement of said gage and including a plurality of pulse generating means spaced thereon to define successive positions of said back gage, two-speed drive means for moving said back gage, pulse sensing means for scanning said position control means, means driving said sensing means to scan cyclically over a portion of the path along which said position control means travels, means defining a reference position in said portion of said path scanned by said sensing means, means defining a control zone within said scanning path of said sensing means in advance of said reference position, means arranged to sense the entry of a pulse generating means into said control zone including a speed controller connected to reduce the speed of said back gage drive means, and means operative by said sensing means and said reference position defining means to stop said movable member in response to a predetermined relation between a pulse generating means and said reference position.

11. In combination with a cutting machine having a work table and a knife reciprocably operable in a cutting plane relative to said table, a back gage operable along the surface of said table toward and away from said cutting plane to position material to be cut with respect to said knife, back gage position control means movable along a defined path in relation to movement of said gage and capable of storing record impulse generating means in predetermined sequence thereon providing a record of desired successive positions of said back gage, said position control means also being capable of storing separately record impulse generating means defining the limits of movement of said back gage, reversible drive means connected to move said back gage, first pulse sensing means for scanning said position control means to determine the sequence of successive positions desired, second pulse sensing means for scanning said position control means to sense the limit impulse generating means thereon, means driving said first sensing means to scan cyclically over a portion of the path along which said position control means travels, means including a reference pulse generating means defining a reference position in said portion of said path scanned by said first sensing means, means operative by said first sensing means and said reference pulse generating means to disable said drive means and halt said back gage in response to a predetermined relation between said pulse generating means and said reference position, means connected to said second sensing means and to said reversible drive means for reversing the direction of said back gage drive in response to a signal from said second sensing means, and means for disabling the connection between said first sensing means and said drive means when said back gage is moving in a direction away from said knife.

12. In combination with a cutting machine having a work table and a knife reciprocably operable in a cutting plane relative to said table, a back gage operable along the surface of said table toward and away from said cutting plane to position material to be cut with respect to said knife, back gage position control means movable along a defined path in relation to movement of said gage and capable of storing record impulse generating means in predetermined sequence thereon providing a record of desired successive positions of said back gage, said position control means also being capable of storing separately record impulse generating means defining the limits of movement of said back gage, two-speed reversible drive means connected to move said back gage, first pulse sensing means for scanning said position control means to determine the sequence of successive positions desired, second pulse sensing means for scanning said position control means to sense the limit impulse generating means thereon, means driving said first sensing means to scan cyclically over a portion of the path along which said position control means travels, means defining a reference position in said portion of said path scanned by said first sensing means, means defining a control zone within said scanning path of said sensing means in advance of said reference position, means arranged to sense the entry of a pulse generating means into said control zone including a speed controller connected to reduce the speed of said back gage drive means, means operative by said first sensing means to disable said drive means and halt said back gage in response to a predetermined relation between said pulse generating means and said reference position, means connected to said second sensing means and to said reversible drive means for reversing the direction of said back gage drive in response to a signal from said second sensing means, and means for disabling the connection between said first sensing means and said drive means when said back gage is moving in a direction away from said knife.

13. In a cutting machine the combination of a work table, a knife mounted for reciprocating movement in a cutting plane relative to said table, drive means for said knife, a back gage mounted on said table, back gage drive means connected to move said back gage toward and away from said cutting plane, a record control tape capable of storing record impulse generating means in predetermined sequence thereon providing a record of desired successive positions of said back gage, means supporting said tape to move in correlated relation to said back gage, a drive connection between said tape and said back gage drive means, sensing means scanning said tape cyclically over a portion of the path of movement thereof, means including a reference pulse generating means defining a reference position within the scanning range of said sensing means, means controlled by said reference pulse generating means and said sensing means and connected to stop said back gage when a pulse generating means on said tape is located in predetermined relation to said reference position, means providing a visual representation of said reference position, and means operative from said scanning means to produce a visual representation of all impulse generating means within said scanned portion of said tape during each scanning cycle to maintain a visual comparison of relative movement between impulse generating means on said tape and said reference position.

References Cited by the Examiner
UNITED STATES PATENTS

| | | | |
|---|---|---|---|
| 2,742,088 | 4/56 | Thomann et al. | 83—71 |
| 2,781,019 | 2/57 | Tiger | 274—43 |
| 2,860,705 | 11/58 | Thumim | 104—178 |
| 2,879,692 | 3/59 | Turner | 88—24 |
| 2,915,357 | 12/59 | Barkley | 346—138 |
| 2,933,013 | 4/60 | Baker et al. | 88—24 |
| 2,992,578 | 7/61 | Hribar | 83—71 |
| 3,118,334 | 1/64 | Blaha | 83—71 |

ANDREW R. JUHASZ, *Primary Examiner.*

CARL W. TOMLIN, HUNTER C. BOURNE,
*Examiners.*